(No Model.)

A. SCHEID.
SPINDLE.

No. 580,725. Patented Apr. 13, 1897.

WITNESSES:
Wm. D. Nell.
A. D. Rumsey.

INVENTOR:
Adam Scheid

BY Gartner & Co ATTY'S.

UNITED STATES PATENT OFFICE.

ADAM SCHEID, OF HARRISON, NEW JERSEY, ASSIGNOR TO THE DRAPER COMPANY, OF PORTLAND, MAINE.

SPINDLE.

SPECIFICATION forming part of Letters Patent No. 580,725, dated April 13, 1897.

Application filed December 29, 1896. Serial No. 617,333. (No model.)

*To all whom it may concern:*

Be it known that I, ADAM SCHEID, a citizen of the United States, residing in Harrison, county of Hudson, and State of New Jersey, have invented certain new and useful Improvements in Spindles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a support for a spinning-spindle having a flexible connection with the spindle-rail, to thus render the spindle capable of adjusting itself to an unbalanced load.

It consists in the details of construction and combination of parts, substantially as will be hereinafter more fully described, and finally embodied in the clauses of the claim.

Figure 1:
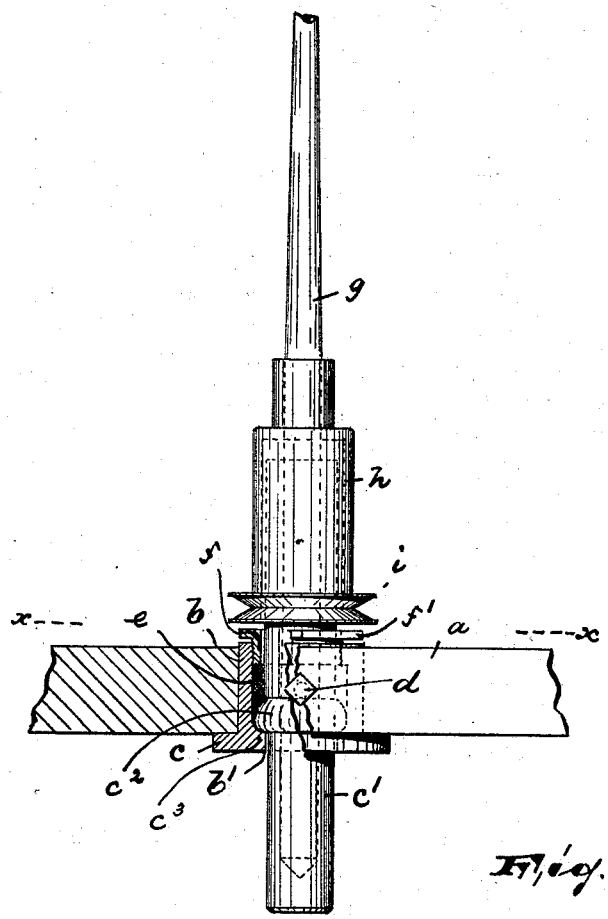
Figure 2:
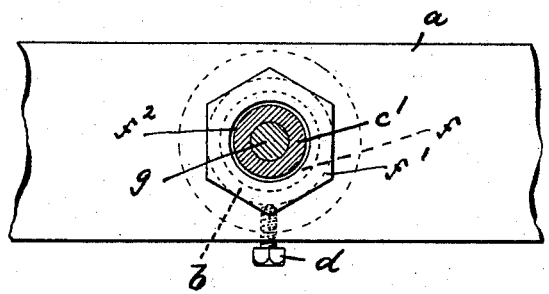

In the accompanying drawings, Figure 1 is a front elevation of my improved spindle-support with certain portions broken away and others shown in section, and Fig. 2 a sectional view on the line $x\,x$ of Fig. 1.

In said drawings, $a$ represents the spindle-rail, penetrated by the sleeve $b$, secured thereto by the set-screw $d$ and bearing with its annular flange $c$ against the under side of the rail. Said sleeve $b$ is provided at its lower portion with an inwardly-extending annular flange $c^3$, penetrated by a central cylindrical hole $b'$, while its upper portion is internally threaded, as clearly shown in Fig. 1.

The tube $c'$, containing step and bolster bearing for the spindle $g$, (having sleeve $h$ and whirl $i$,) is provided with a spherical-shaped enlargement $c^2$, resting on the inwardly-extending annular flange $c^3$ and adapted to form the fulcrum or center of oscillation for the said tube $c'$. A packing $e$, made of suitable elastic material, is arranged around the tube $c'$ and within the sleeve $b$ and rests on the upper half of the spherical-shaped enlargement $c^2$ and is retained in said sleeve and in close contact with the tube $c'$ by means of the cap or bushing $f$, externally threaded, and provided with a polygonal-shaped head or flange $f'$ to facilitate its being secured within the internally-threaded portion of the sleeve $b$. It must be remarked that the central opening in said head or bushing $f$, as well as the cylindrical hole or opening $b'$, are of larger diameter than the diameter of the tube $c'$.

From the foregoing it will be seen that the tube $c'$ is allowed a certain yielding motion within the sleeve $b$, and that said motion can easily be regulated by compressing the packing $e$ or allowing it to expand against the action of the head or bushing $f$.

Having thus described my invention, what I claim as new, and desire to secure by Letters Patent, is—

1. The combination with the spindle-rail, of a sleeve arranged in said rail, and internally threaded at its upper inner portion, a tube penetrating said sleeve and carried thereby, a flexible packing in said sleeve and surrounding the tube, an externally-threaded head or bushing penetrated by said tube and arranged in the internally-threaded portion of the sleeve, a polygonal-shaped head or flange projecting from said bushing and a whirl-driven spindle in said tube, and having its whirl arranged above said polygonal-shaped head or flange, all said parts, substantially as and for the purposes described.

2. The combination with the spindle-rail, of a sleeve arranged in said rail and provided at its lower portion with an inwardly-extending annular flange and having its upper portion internally threaded, a tube penetrating said sleeve and provided with an enlargement resting on said flange, a packing in said sleeve and bearing against said enlargement, an externally-threaded head or bushing penetrated by said tube and engaging the internally-threaded portion of the sleeve, a polygonal-shaped head or flange projecting from said bushing and a whirl-driven spindle in the tube, and having its whirl arranged above said polygonal-shaped head or flange, all said parts substantially as and for the purposes described.

In testimony that I claim the foregoing I have hereunto set my hand this 17th day of December, 1896.

ADAM SCHEID.

Witnesses:
ALFRED GARTNER,
WM. D. BELL.